US011869423B2

(12) United States Patent
Gao et al.

(10) Patent No.: US 11,869,423 B2
(45) Date of Patent: Jan. 9, 2024

(54) PIXEL CIRCUIT AND DRIVING METHOD THEREOF, DISPLAY PANEL AND DISPLAY APPARATUS

(71) Applicant: BOE TECHNOLOGY GROUP CO., LTD., Beijing (CN)

(72) Inventors: Xueling Gao, Beijing (CN); Chengchung Yang, Beijing (CN); Tieshi Wang, Beijing (CN); Jintao Peng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 1182 days.

(21) Appl. No.: 16/486,201

(22) PCT Filed: Jan. 14, 2019

(86) PCT No.: PCT/CN2019/071655
§ 371 (c)(1),
(2) Date: Aug. 15, 2019

(87) PCT Pub. No.: WO2019/237735
PCT Pub. Date: Dec. 19, 2019

(65) Prior Publication Data

US 2023/0206832 A1 Jun. 29, 2023

(30) Foreign Application Priority Data

Jun. 13, 2018 (CN) ......................... 201810608546.3

(51) Int. Cl.
*G09G 3/3233* (2016.01)

(52) U.S. Cl.
CPC ... *G09G 3/3233* (2013.01); *G09G 2300/0426* (2013.01); *G09G 2300/0819* (2013.01); *G09G 2300/0852* (2013.01); *G09G 2310/08* (2013.01); *G09G 2320/0233* (2013.01); *G09G 2320/041* (2013.01); *G09G 2320/045* (2013.01); *G09G 2330/028* (2013.01)

(58) Field of Classification Search
CPC ......... G09G 3/3233; G09G 2300/0426; G09G 2300/0819; G09G 2300/0852; G09G 2310/08; G09G 2320/0233; G09G 2320/041; G09G 2320/045; G09G 2330/028
See application file for complete search history.

(56) References Cited

U.S. PATENT DOCUMENTS 10,685,603 B2 * 6/2020 Jeong .................... G06F 3/0412
2007/0242068 A1 * 10/2007 Han ....................... H04N 13/31
348/E13.059

(Continued)

FOREIGN PATENT DOCUMENTS

| | | | |
|---|---|---|---|
| CN | 105575327 | A | 5/2016 |
| CN | 107464526 | A | 12/2017 |
| CN | 108470539 | A | 8/2018 |

*Primary Examiner* — Kwang-Su Yang
(74) *Attorney, Agent, or Firm* — Dilworth & Barrese, LLP.; Michael J. Musella, Esq.

(57) ABSTRACT

A pixel circuit, a display panel, a display apparatus and a driving method. The pixel circuit includes a data signal writing module, a driving module, a threshold compensation transistor, a first power voltage writing module and a light-emitting module, wherein the driving module includes a driving transistor.

19 Claims, 10 Drawing Sheets

(56) References Cited

U.S. PATENT DOCUMENTS

| | | | | |
|---|---|---|---|---|
| 2011/0310077 | A1 | 12/2011 | Hwang et al. | |
| 2015/0364076 | A1* | 12/2015 | Park | G09G 3/3233 345/77 |
| 2016/0232849 | A1* | 8/2016 | Jeon | G09G 3/3233 |
| 2018/0151115 | A1* | 5/2018 | Tseng | G09G 3/3233 |
| 2018/0197476 | A1* | 7/2018 | Xi | G09G 3/3233 |

* cited by examiner

PIXEL CIRCUIT AND DRIVING METHOD THEREOF, DISPLAY PANEL AND DISPLAY APPARATUS

CROSS-REFERENCE TO RELATED APPLICATIONS

This application claims priority to Chinese Patent Application No. 201810608546.3, filed Jun. 13, 2018, incorporated herein by reference in its entirety as a part of the present application.

TECHNICAL FIELD

The present disclosure relates to a field of display technologies, and particularly, to a pixel circuit and a driving method thereof, a display panel and a display apparatus.

BACKGROUND

In an organic light-emitting diode (OLED) display panel, threshold voltages of driving transistors in respective pixel units may differ from each other due to fabrication processes, and the threshold voltages of driving transistors may also drift due to, for example, impact of temperature change. Therefore, the differences in the threshold voltages of the respective driving transistors may also lead to non-uniform display of the display panel, inconsistent luminous brightness of light-emitting devices and the like.

Moreover, currently, pixel circuits in displays (e.g., OLED displays) are typically composed of low-temperature polysilicon thin film transistors (LTPS TFTs). However, LTPS TFTs have leakage current ($I_{off}$) at an off state, and the leakage current is not flat and has a warped-tail phenomenon, making it difficult to effectively lock voltage written into the driving transistor during one frame of a displayed picture.

SUMMARY OF THE INVENTION

In order to solve the above problem, a first aspect of the present disclosure provides a pixel circuit. The pixel circuit may comprise: a data signal writing module, a driving module, a threshold compensation transistor, a first power voltage writing module and a light-emitting module, wherein the driving module comprises a driving transistor, the first power voltage writing module is connected to a first light-emitting control signal terminal, a first power voltage terminal, a source of the driving transistor and a gate of the driving transistor and configured to write a first power voltage signal of the first power voltage terminal to the source of the driving transistor under control of a first light-emitting control signal of the first light-emitting control signal terminal; the data signal writing module is connected to a writing control terminal, a data signal terminal and the source of the driving transistor and configured to transmit a data signal of the data signal terminal to the source of the driving transistor under control of a writing control signal of the writing control terminal; the threshold compensation transistor has a gate connected to a first node, a source connected to the gate of the driving transistor and a drain connected to a drain of the driving transistor and configured to perform voltage compensation to the gate of the driving transistor in case that the first node is at an valid level; and the light-emitting module has a first terminal connected to the drain of the driving transistor and a second terminal connected to a second power voltage terminal.

In one example, the threshold compensation transistor may be an oxide transistor.

In one example, the pixel circuit further comprises a reference signal writing module connected to a reference control terminal, a reference signal terminal, the first light-emitting control signal terminal and the first node and configured to control potential of the first node according to a reference control signal of the reference control terminal and the first light-emitting control signal of the first light-emitting control signal terminal.

In one example, the pixel circuit further comprises a reset module connected to a reset control terminal, a reset potential terminal and a first terminal of the light-emitting module and configured to reset the first terminal of the light-emitting module and the gate of the driving transistor under control of a reset control signal of the reset control terminal.

In one example, the pixel circuit further comprises a light-emitting control module connected to a second light-emitting control signal terminal, the drain of the drive transistor and the first terminal of the light-emitting module, and configured to drive the light-emitting module to emit light under control of a second light-emitting control signal of the second light-emitting control signal terminal.

In one example, the reference signal writing module comprises: a reference signal writing transistor having a gate connected to the reference control terminal, a source connected to the first node, and a drain connected to the reference signal terminal; and a first capacitor connected between the first light-emitting control signal terminal and the first node.

In one example, the data signal writing module comprises a data writing transistor having a gate connected to a data writing control terminal, a source connected to the data signal terminal, and a drain connected to the source of the drive transistor.

In one example, the first power voltage writing module comprises a first power voltage writing transistor having a gate connected to the first light-emitting control signal terminal, a source connected to the first power voltage terminal, and a drain connected to the source of the driving transistor.

In one example, the driving module further comprises a second capacitor connected between the first power voltage terminal and the gate of the driving transistor.

In one example, the light-emitting control module comprises a light-emitting control transistor having a gate connected to the second light-emitting control signal terminal, a source connected to the drain of the driving transistor, and a drain connected to the first terminal of the light-emitting module.

In one example, the light-emitting module comprises an organic light-emitting diode OLED, an anode of the OLED serving as the first terminal of the light-emitting module, and a cathode of the OLED serving as the second terminal of the light-emitting module.

In one example, the reset module comprises a reset transistor having a gate connected to the reset control terminal, a source connected to the first terminal of the light-emitting module, and a drain connected to the reset potential terminal.

In one example, a second power voltage of the second power voltage terminal is lower than a reset potential of the reset potential terminal.

A second aspect of the present disclosure provides a method for driving any of the pixel circuits of the first aspect of the present disclosure. The method may comprise: in a data writing and threshold compensation phase, writing the data signal of the data signal terminal to the source of the driving transistor, the writing control signal of the writing control terminal being at a first level, and the reference control signal of the reference control terminal being hopped from the first level to a second level, level of the first light-emitting control signal being hopped from the first level to the second level, level of the first node being raised, and potential of the gate of the driving transistor being compensated under control of the first node; in a light-emitting phase, a driving current of the driving transistor flowing to the light-emitting module to drive the light-emitting module to emit light, and the second light-emitting control signal of the second light-emitting control signal terminal being at the first level.

In one example, the pixel circuit further comprises a reference signal writing module connected to the reference control terminal, the reference signal terminal, the first light-emitting control signal terminal, and the first node; and the method further comprises: a first initialization phase and a second initialization phase, in the first initialization phase, the reference control signal of the reference control terminal being at a first level, and the reference signal of the reference signal terminal being transmitted to the first node; in the second initialization phase, the reference control signal of the reference control terminal being hopped from the first level to the second level, the level of the first light-emitting control signal being hopped from the first level to the second level, and the level of the first node being raised.

In one example, the pixel circuit further comprises a reset module connected to the reset control terminal, the reset potential terminal, and the first terminal of the light-emitting module; in the second initialization phase, the reset control signal of the reset control terminal being at the first level, and the reset potential of the reset potential terminal being transmitted to the first terminal of the light-emitting module and the gate of the driving transistor.

In one example, the reference signal of the reference signal terminal is adjusted based on an offset of a threshold voltage of the threshold compensation transistor after the pixel circuit has operated for a preset time.

In one example, the pixel circuit further comprises a light-emitting control module connected to the second light-emitting control signal terminal, the drain of the driving transistor, and the first terminal of the light-emitting module; and after the data writing and threshold compensation phase and before the light-emitting phase, the method further comprises a pre-light-emitting phase, in the pre-light-emitting phase, the first light-emitting control signal of the first light-emitting control signal terminal being at a first level, and a first power voltage of the first power voltage terminal being transmitted to the source of the driving transistor.

In one example, gate potential of the drive transistor is compensated as a sum of potential of the data signal and threshold potential of the drive transistor in the data writing and threshold compensation phase.

In one example, the first level is lower than the second level.

A third aspect of the present disclosure further provides a display panel comprising any of the pixel circuits of the first aspect of the present disclosure.

A fourth aspect of the present disclosure further provides a display apparatus comprising the display panel of the third aspect of the present disclosure.

BRIEF DESCRIPTION OF THE DRAWINGS

The accompanying drawings of embodiments will be briefly described below to illustrate technical solutions of the embodiments of the present disclosure more clearly. It is obvious that the drawings in the following description merely relates to some of the embodiments of the present disclosure, and are not intended to be a limitation of the present disclosure.

DESCRIPTION OF THE EMBODIMENTS

Figure 1:
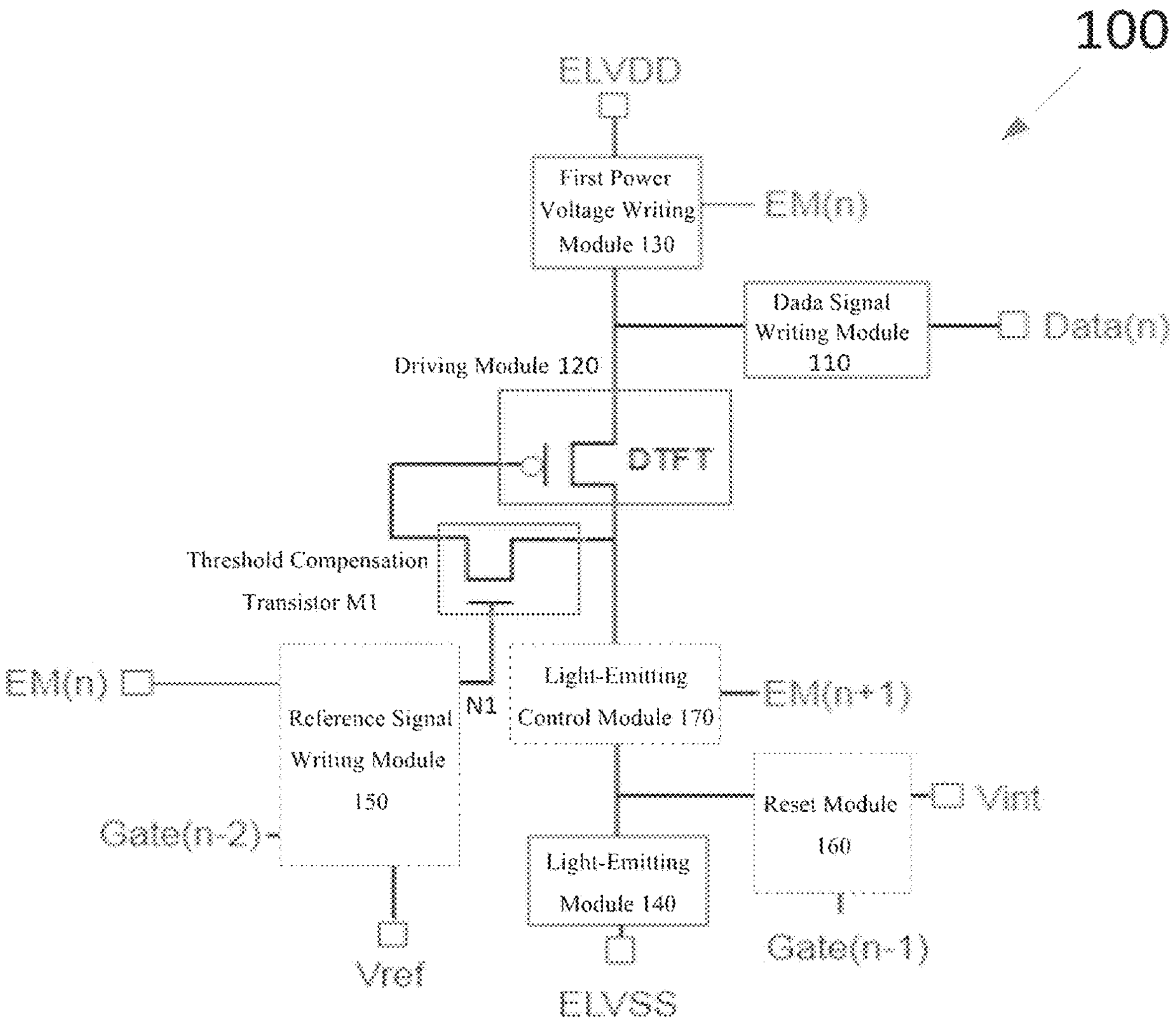
FIG. 1 illustrates a schematic structural diagram of a pixel circuit according to an embodiment of the present disclosure.

The respective embodiments according to the present disclosure will be described in detail with reference to the accompanying drawings. Herein, it should be noted that in the drawings, the same reference numerals are given to components having substantially the same or similar structures and functions, and repeated description about them will be omitted.

In order to make the objectives, technical solutions and advantages of the embodiments of the present disclosure more clear, the technical solutions of the embodiments of the present disclosure will be clearly and thoroughly described below in conjunction with the accompanying drawings of the embodiments of the present disclosure. Apparently, the described embodiments are a part but not all of the embodiments of the present disclosure. All other embodiments obtained by a person of ordinary skill in the art based on the embodiments of the present disclosure described herein without creative effort fall within the scope of the present disclosure.

Technical terms or scientific terms used herein have ordinary meanings that should be understood by a person of ordinary skill in the art of the present disclosure, unless otherwise specified. The terms 'first', 'second' and the like used in the present disclosure do not mean any order, quantity, or importance, but are used to distinguish different components. Similarly, the terms 'comprise', 'include' and the like mean that elements or objects before the terms cover elements or objects and equivalents thereof listed after the terms, without excluding other elements or objects. The terms "connection" or "connect" and the like are not limited to physical or mechanical connections, but may comprise electrical connections, no matter direct or indirect.

Transistors employed in all embodiments of the present disclosure may be thin film transistors or field effect transistors or other devices having the same characteristics. In the embodiments, connection modes of a drain and a source of each transistor are interchangeable, and thus there is actually no difference in the drain and the source of each transistor in the embodiments of the present disclosure.

Herein, only to distinguish two poles of a transistor except the gate, one pole is called the drain and the other pole is called the source.

FIG. 1 illustrates a schematic structural diagram of a pixel circuit according to embodiments of the present disclosure. As shown in FIG. 1, a pixel circuit 100 may comprise a data signal writing module 110, a driving module 120, a threshold compensation transistor M1, a first power voltage writing module 130, and a light-emitting module 140, where the driving module 120 may comprise a driving transistor DTFT.

For example, the data signal writing module 110 may be connected to a data writing control terminal Gate (n), a data signal terminal Data (n), and source of the driving transistor DTFT. The data signal writing module 110 is used to transmit a data signal Data(n) of the data signal terminal to the source of the driving transistor under control of a data writing control signal of the data writing control terminal Gate(n).

The threshold compensation transistor M1 has a gate connected to a first node N1, a source connected to a gate of the driving transistor DTFT, and a drain connected to a drain of the driving transistor DTFT. The threshold compensation transistor M1 is used to perform voltage compensation to the gate of the driving transistor DTFT when the first node N1 is at an valid level.

The first power voltage writing module 130 is connected to a first light-emitting control signal terminal EM(n), a first power voltage terminal ELVDD, and the source of the driving transistor DTFT. The first power voltage writing module 130 is used to write a first power voltage signal of the first power voltage terminal ELVDD to the source of the driving transistor DTFT under control of a first light-emitting control signal of the first light-emitting control signal terminal EM(n).

The light-emitting module 140 has a first terminal connected to a light-emitting control module and a second terminal connected to a second power voltage terminal ELVSS.

When the first node N1 is at the valid level that turns on the threshold compensation transistor M1, the turn-on of the threshold compensation transistor M1 may connect the gate and the drain of the driving transistor DTFT, thereby forming a path adjusting (for example, resetting or compensating) voltage of the gate of the driving transistor DTFT through the drain of the driving transistor DTFT.

However, a low-temperature polysilicon (LTPS) thin film transistor (TFT) is commonly used in a conventional pixel circuit to perform threshold voltage compensation to the driving transistor DTFT. However, the current (La) of LTPS TFTs at an off state is obvious and the $I_{off}$ has a warped-tail phenomenon, resulting in leakage current in the pixel circuit and voltage after the data resource compensation cannot be well locked.

In view of the above problem, the threshold compensation transistor M1 may employ, for example, an oxide transistor (Oxide TFT) in embodiments of the present disclosure. The Oxide TFT has the following advantages over the LTPS TFT: current of the Oxide TFT at an off state is relatively small with an order of magnitude of 1.0E-13, and the current at the off state is flat. Therefore, the leakage current in the pixel circuit is very small when the Oxide TFT is used instead of the LTPS TFT for voltage compensation, so that the problem that the luminous brightness of the light-emitting device in the pixel circuit is inconsistent may be significantly improved.

In one example, the pixel circuit 100 shown in FIG. 1 may further comprise a reference signal writing module 150 connected at the first node N1 for controlling potential of the N1 node. For example, the reference signal writing module 150 may also be connected to a reference control terminal Gate(n−2), a reference signal terminal Vref, and the first light-emitting control signal terminal EM(n). The reference signal writing module 150 is used to control the potential of the first node N1 according to a reference control signal of the reference control terminal Gate(n−2) and the first light-emitting control signal of the first light-emitting control signal terminal EM(n).

In one example, the pixel circuit 100 shown in FIG. 1 may further comprise a reset module 160 that may be connected to a reset control terminal Gate(n−1), a reset potential terminal Vint, and the first terminal of the light-emitting module. The reset module 160 is used to reset the first terminal of the light-emitting module under control of a reset control signal of the reset control terminal Gate(n−1).

In one example, the pixel circuit 100 shown in FIG. 1 may further comprise a light-emitting control module 170 that may be connected to a second light-emitting control signal terminal EM(n+1), the drain of the driving transistor, and the light-emitting module. The light-emitting control module 170 may also be configured to drive the light-emitting module to emit light under control of the second light-emitting control signal of the second light-emitting control signal terminal EM(n+1).

Figure 2:
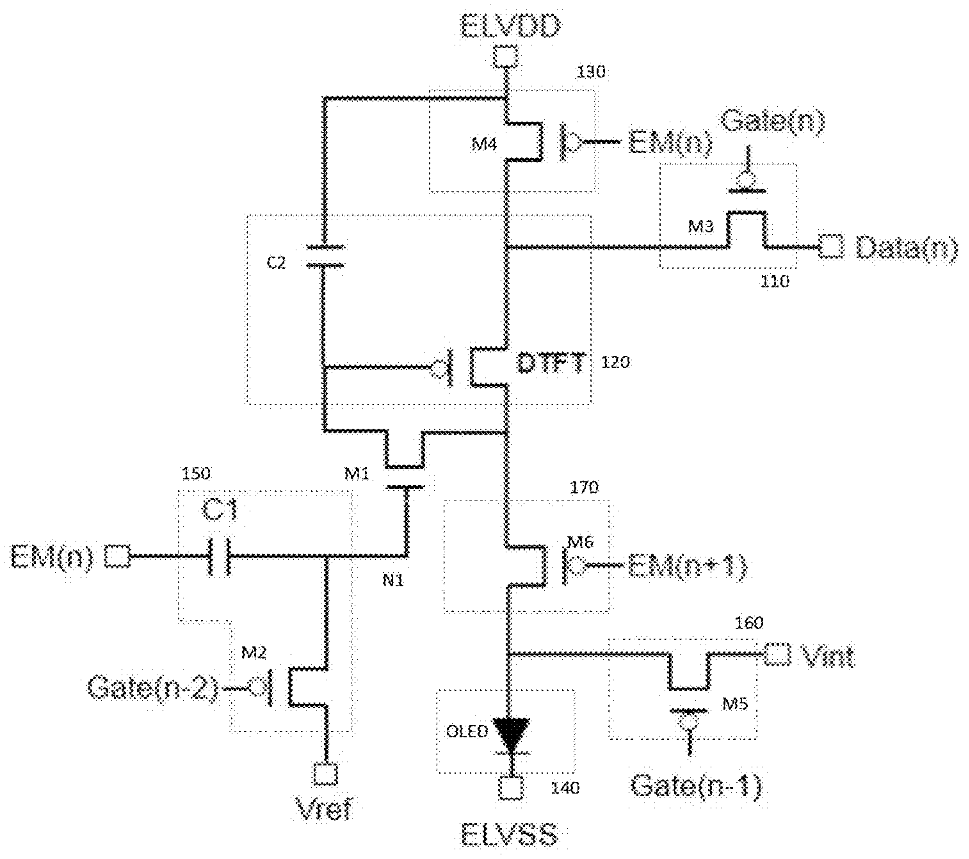
FIG. 2 illustrates a specific circuit diagram of the pixel circuit shown in FIG. 1.

FIG. 2 illustrates a specific circuit diagram of the pixel circuit shown in FIG. 1. In the pixel circuit as shown in FIG. 2, the reference signal writing module 150 may comprise a reference signal writing transistor M2 and a first capacitor C1. For example, a gate of the reference signal writing transistor M2 may be connected to a reference control terminal Gate(n−2), a source is connected to the first node N1, and a drain is connected to the reference signal terminal Vref. The reference signal writing transistor M2 is used to transmit a reference signal of the reference signal terminal Vref to the first node N1 under control of the reference control signal of the reference control terminal Gate (n−2). The first capacitor C1 may be connected between the first light-emitting control signal terminal EM(n) and the first node N1; and the first capacitor C1 is used to change the voltage at the first node N1 accordingly when there is an abrupt change in the light-emitting control signal of the first light-emitting control signal terminal EM(n), so as to maintain a constant voltage difference across two terminals of the first capacitor C1.

In one example, the data signal writing module 110 may comprise a data writing transistor M3. A gate of the data writing transistor M3 is connected to the data writing control terminal Gate(n), a source of the data writing transistor M3 is connected to the data signal terminal Data(n), and a drain of the data writing transistor M3 is connected to the source of the driving transistor DTFT. The data writing transistor M3 is used to write the data signal of the data signal terminal Data(n) to the source of the driving transistor DTFT under control of the writing control signal of the writing control terminal Gate(n).

In one example, the driving module 120 may further comprise a second capacitor C2. The second capacitor C2 is connected between the gate of the driving transistor DTFT and the first power voltage terminal ELVDD. The second capacitor C2 is used to maintain stabilization of the gate voltage of the DTFT after compensation of the threshold voltage of the driving transistor DTFT is completed.

In one example, the first power voltage writing module 130 may comprise a first power voltage writing transistor M4. A gate of the first power voltage writing transistor M4 is connected to the first light-emitting control signal terminal EM(n), a source of the first power voltage writing transistor M4 is connected to the first power voltage terminal ELVDD, and a drain of the first power voltage writing transistor M4 is connected to the source of the driving transistor DTFT. The first power voltage writing transistor M4 is used to write a first power voltage of the first power voltage terminal ELVDD to the gate of the driving transistor DTFT under control of the first light-emitting control signal of the first light-emitting control signal terminal EM(n).

In one example, the reset module 160 may comprise a reset transistor M5. A gate of the reset transistor M5 is connected to the reset control terminal Gate(n−1), a source of the reset transistor M5 is connected to the first terminal of the light-emitting module 140, and a drain of the reset transistor M5 is connected to the reset potential terminal Vint. The reset transistor M5 is used to reset the first terminal of the light-emitting module 140 and the gate of the driving transistor under control of the reset control signal of the reset control terminal Gate(n−1).

In one example, the light-emitting module 140 may comprise a light-emitting device, for example, an organic light-emitting diode (OLED). For example, an anode of the OLED is used as the first terminal of the light-emitting module, and a cathode of the OLED is used as the second terminal of the light-emitting module.

In one example, the light-emitting control module 170 may comprise a light-emitting control transistor M6. A gate of the light-emitting control transistor M6 is connected to the second light-emitting control signal terminal EM(n+1), a source of the light-emitting control transistor M6 is connected to the drain of the driving transistor DTFT, and a drain of the light-emitting control transistor M6 is connected to the first terminal of the light-emitting module 140. The light-emitting control transistor M6 is used to transmit a driving current flowing through the driving transistor DTFT to the light-emitting module 140 under control of the second light-emitting control signal of the second light-emitting control signal terminal EM(n+1) to drive the light-emitting module 140 to emit light.

Moreover, for example, in order to ensure that the OLED does not emit light when a reset potential of the reset potential terminal Vint is transmitted to the first terminal of the light-emitting module 140 (the anode of the OLED), it is necessary to satisfy that the anode voltage of the OLED is lower than the cathode voltage thereof, that is, voltage of a reset signal of the reset potential terminal Vint is lower than a second power voltage of the second power voltage terminal ELVSS.

Certainly, the first power voltage of the first power voltage terminal ELVDD should be higher than the second power voltage of the second power voltage terminal ELVSS, to ensure subsequent normal light-emitting of the light-emitting device.

The embodiments of the present disclosure are illustrated with an example in which the threshold compensation transistor M1 is an N-type transistor (an oxide N-type transistor), and the driving transistor DTFT, the reference signal writing transistor M2, the data writing transistor M3, the first power voltage writing transistor M4, the rese transistor M5 and the light-emitting control transistor M6 are all P-type transistors. Based on the description and teachings of the implementation of the present disclosure, a person of ordinary skill in the art can readily conceive of implementations of the embodiments of the present disclosure employing N-type transistors or a combination of N-type and P-type transistors without making creative efforts, and therefore these implementations are also within the scope of the present disclosure.

It should be appreciated that FIG. 2 only illustrates one exemplary circuit structure of the pixel circuit according to embodiments of the present disclosure, while actually respective modules in the pixel circuit may have various circuit structures, which is not limited by the present disclosure.

Embodiments of the present disclosure further provides a method for driving the above pixel circuit. For example, a flow chart of the method for driving the pixel circuit in the above embodiments is illustrated in FIG. 3, an exemplary driving time sequence diagram of the pixel circuit as shown in FIG. 1 or FIG. 2 is illustrated in FIG. 4; and an on state of respective transistors in the pixel circuit corresponding to respective stages T1-T5 in FIG. 3 respectively are illustrated in FIGS. 5*a*-5*e*.

Figure 3:
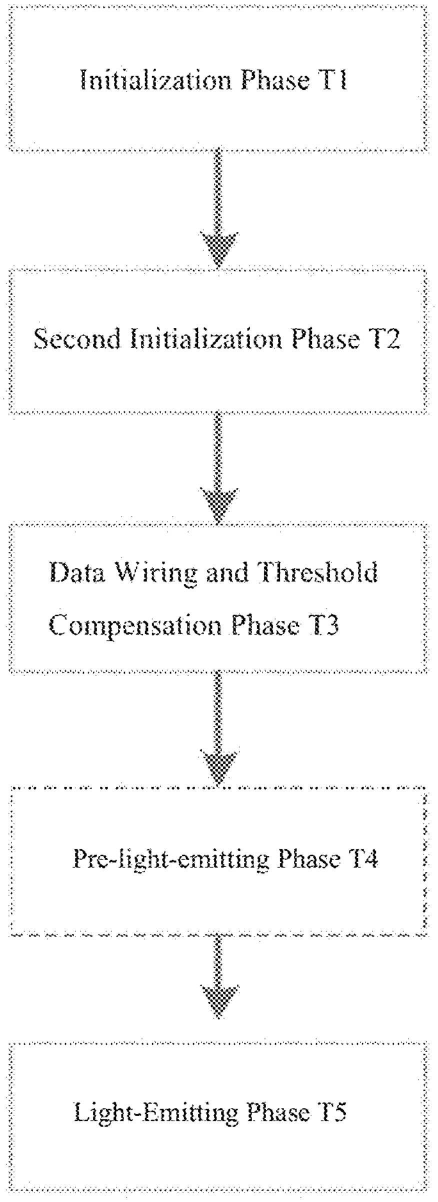
FIG. 3 illustrates a flow chart of a method for driving the pixel circuit in the above embodiment.
Figure 4:
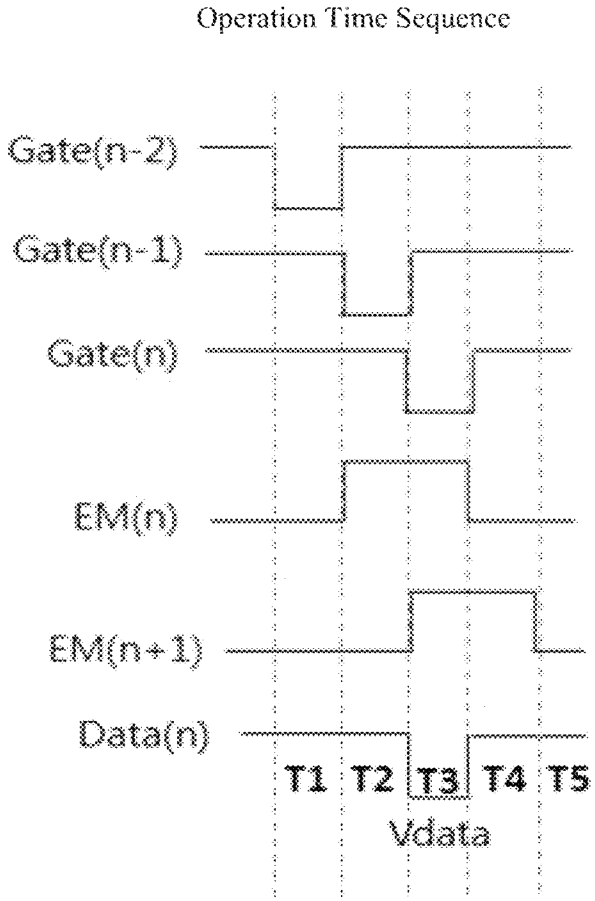
FIG. 4 illustrates an exemplary driving time sequence diagram of the pixel circuit as shown in FIG. 1 or FIG. 2.

As shown in FIG. 3, the driving method may comprise a data writing and threshold compensation phase T3, a light-emitting phase T5 during a display period of one frame.

In the data writing and threshold compensation phase T3, the reference control signal of the reference control terminal Gate(n−2) may be set to a second level, the reset control signal of the reset control terminal Gate(n−1) may be set to the second level, the data writing control signal of the data writing control terminal Gate(n) may be set to a first level, the first light-emitting control signal of the first light-emitting control signal terminal EM(n) may be set to the second level, the second light-emitting control signal of the second light-emitting control signal terminal EM(n+1) may be set to the second level, and the data signal of the data signal terminal Data(n) may be set to a valid data signal.

In the light-emitting phase T5, the reference control signal of the reference control terminal Gate(n−2) may be set to the second level, the reset control signal of the reset control terminal Gate(n−1) may be set to the second level, the data writing control signal of the data writing control terminal Gate(n) may be set to the second level, the first light-emitting control signal of the first light-emitting control signal terminal EM(n) may be set to the first level, the second light-emitting control signal of the second light-emitting control signal terminal EM(n+1) may be set to the first level, and the data signal of the data signal terminal Data(n) may be set to an invalid data signal.

In one example, the above driving method may further comprise a first initialization phase T1 and a second initialization phase T2.

For example, in the first initialization phase T1, the reference control signal of the reference control terminal Gate(n−2) may be set to the first level, the reset control signal of the reset control terminal Gate(n−1) may be set to the second level, the data writing control signal of the data writing control terminal Gate(n) may be set to the second level, the first light-emitting control signal of the first light-emitting control signal terminal EM(n) may be set to the first level, the second light-emitting control signal of the second light-emitting control signal terminal EM(n+1) may be set to the first level, and the data signal of the data signal terminal Data(n) may be set to the invalid data signal.

In the second initialization phase T2, the reference control signal of the reference control terminal Gate(n−2) may be set to the second level, the reset control signal of the reset control terminal Gate(n−1) may be set to the first level, the data writing control signal of the data writing control terminal Gate(n) may be set to the second level, the first light-emitting control signal of the first light-emitting control signal terminal EM(n) may be set to the second level, the second light-emitting control signal of the second light-emitting control signal terminal EM(n+1) may be set to the first level, and the data signal of the data signal terminal Data(n) may be set to the invalid data signal.

In one example, the above driving method may further comprise a pre-light-emitting phase T4 after the data writing and threshold compensation phase T3 and before the light-emitting phase T5. In the pre-light-emitting phase T4, the reference control signal of the reference control terminal Gate(n−2) may be set to the second level, the reset control signal of the reset control terminal Gate(n−1) may be set to the second level, the data writing control signal of the data writing control terminal Gate(n) may be set to the second level, the first light-emitting control signal of the first light-emitting control signal terminal EM(n) may be set to the first level, the second light-emitting control signal of the second light-emitting control signal terminal EM(n+1) may be set to the second level, and the data signal of the data signal terminal Data(n) may be set to the invalid data signal.

Typically, the threshold voltage of the threshold compensation transistor will shift after the pixel circuit has been operating for a period of time. For example, if the threshold compensation transistor is an N-type transistor, since the threshold voltage of the N-type transistor is at a high level, the threshold voltage of the N-type transistor will shift toward a negative direction after it has been operated for a period of time. At this time, in order to prevent the threshold compensation transistor from being turned on when it should be turned off, it is necessary to adjust the voltage signal applied to the gate of the threshold compensation transistor, that is, the reference signal of the reference signal terminal may be adjusted based on the shifting of the threshold voltage of the threshold compensation transistor.

In the embodiments of the present disclosure, for example, the first level is a low level VGL and the second level is a high level VGH. Moreover, as described above, in the embodiments of the present disclosure, the threshold compensation transistor is an N-type transistor (for example, the oxide N-type transistor), and the other transistors are all P-type transistors. Thus, the first level (low level) is a valid level that causes the threshold compensation transistor M1 to be turned off, and the second level (high level) is a valid level that causes other modules or other transistors other than the threshold compensation transistor to be turned off.

Certainly, the present disclosure does not limit types of respective transistors used in the pixel circuit. For example, each of the transistors may be configured as a P-type or N-type transistor, in which case the internal connection structure of the pixel circuit needs to be flipped, and respective driving signals need to be adjusted.

Example operations of the pixel circuit according to embodiments of the present disclosure will be described below with reference to FIG. 4, FIG. 2, and FIGS. 5*a*-5*e*.

Figure 5A:
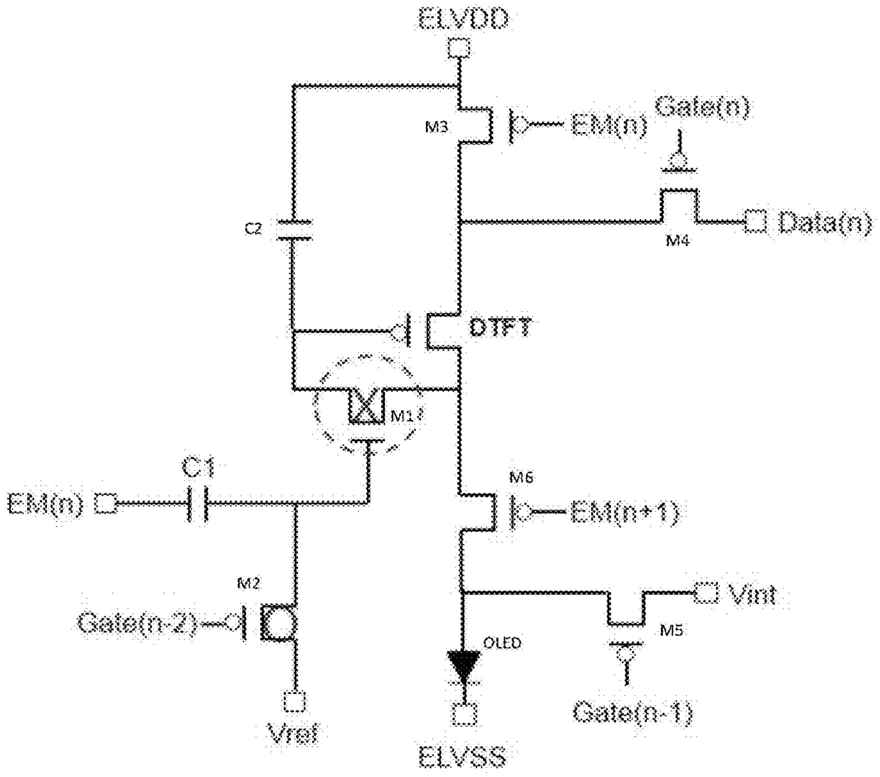
FIGS. 5*a*-5*e* illustrate an on state of respective transistors in the pixel circuit corresponding to each of stages T1-T5 in FIG. 3.

In the first initialization phase T1, the reference control signal of the reference control terminal Gate(n−2) is at the first level, and the reference signal writing transistor M2 is turned on, so that the reference signal of the reference signal terminal Gate(n−2) is transmitted to the first node N1. At this time, the voltage of the first node N1 is the reference signal Vref, and the threshold compensation transistor M1 is turned off. During the first initialization phase T1, conduction states of respective transistors are as shown in FIG. 5*a*.

Figure 5B:
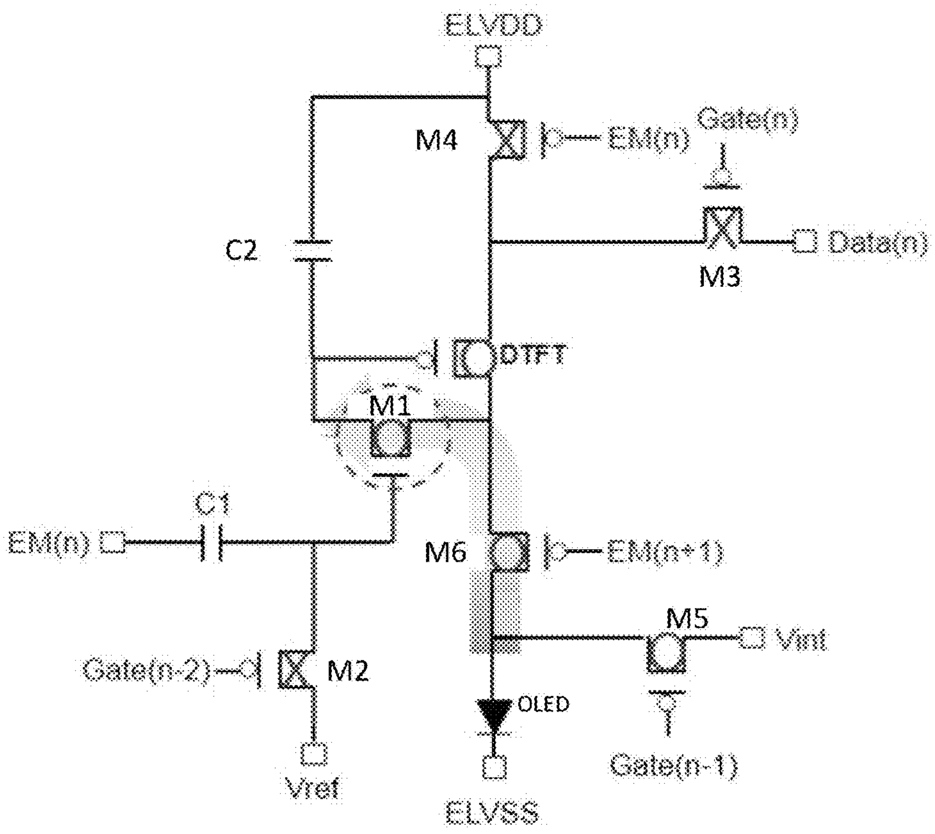

In the second initialization phase T2, the reference control signal of the reference control terminal Gate (n−2) is hopped from the first level to the second level, so that the reference signal writing transistor M2 is turned off. At the same time, the first light-emitting control signal of the first light-emitting control signal terminal EM(n) is hopped from the first level VGL to the second level VGH, and the level of the first node N1 is raised, so that the voltage of the first node N1 is Vref+(VGH−VGL). After the potential of the first node N1 is raised, the threshold compensation transistor M1 is turned on, and at this time, the reset control signal of the reset control terminal Gate(n) is at the first level, so that the reset transistor M5 is turned on, thereby transmitting the rest potential of the reset potential terminal Vint to the anode of the organic light-emitting diode OLED via the reset transistor M5, and further to the gate of the driving transistor DTFT via the threshold compensation transistor M1. Thus, resetting of the anode of the OLED and the gate voltage of the driving transistor DTFT is achieved. At this time, the potentials of the anode of the OLED and the gate of the driving transistor DTFT are both Vint, and since Vint<ELVSS, it is ensured that the OLED does not emit light. The voltage of the source of the DTFT is Vint−Vth, so that the voltage difference between the gate and the source of the driving transistor DTFT is Vgs=Vth, and the driving transistor DTFT is in an off state at this time (the OFF Bias offset is completed), thereby improving poor short-term afterimage phenomenon of the OLED. In the second initialization phase T2, conduction states of respective transistor are as shown in FIG. 5*b*. FIG. 5*b* also illustrates a current flow direction in the pixel circuit at this time, that is, flowing from the reset transistor M5 to the light-emitting control transistor M6 to the threshold compensation transistor M1, and all the way to the gate of the driving transistor DTFT.

Figure 5C:
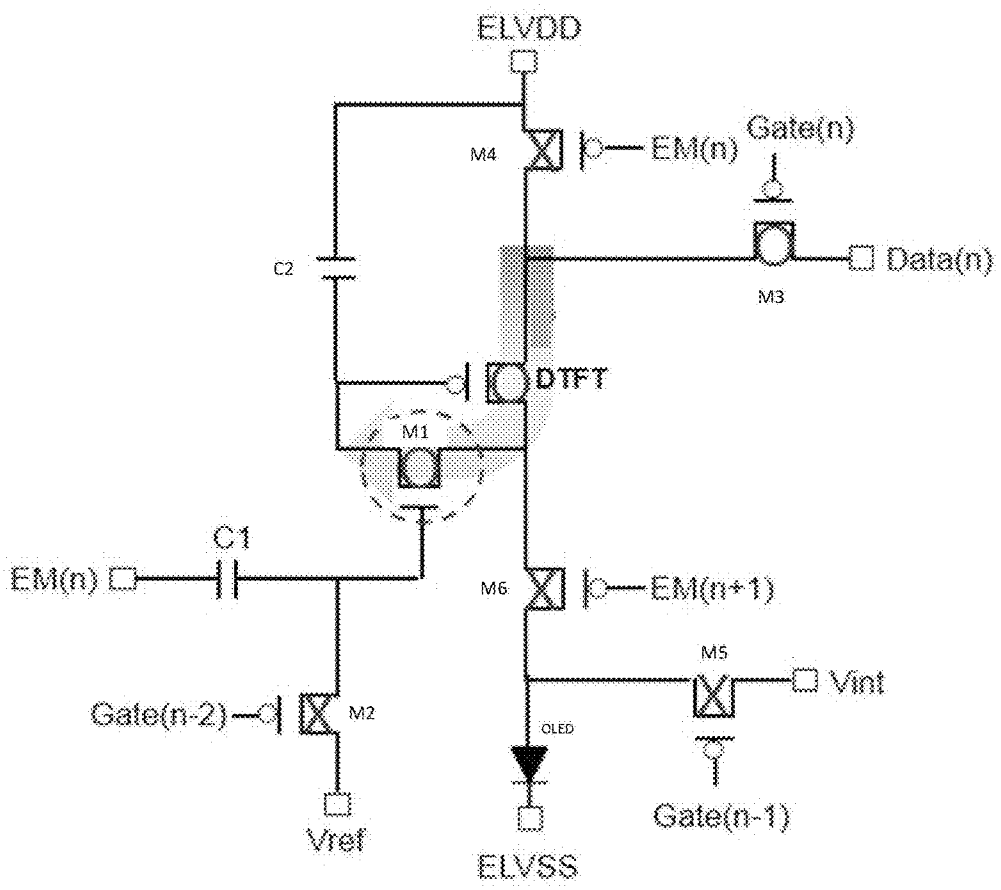

In the data writing and threshold compensation phase T3, the potential of the first node N1 may be maintained as Vref+(VGH-VGL) due to the presence of the first capacitor C1. The reset control signal of the reset control terminal Gate (n−1) is hopped from the first level to the second level, and the reset transistor M5 is turned off. The data writing control signal of the data writing control terminal Gate(n) is at the second level, the data signal writing transistor M3 is turned on, the data signal of the data signal terminal Data(n) is transmitted to the source of the driving transistor DTFT, and the gate voltage of the driving transistor is compensated via the threshold compensation transistor M1. At this time, the voltage of the source of the driving transistor DTFT is Vdata, and the gate voltage of the compensated driving transistor DTFT is Vdata+Vth. In the data writing and threshold compensation phase T3, conduction states of respective transistors are as shown in FIG. 5*c*. FIG. 5*c* also illustrates a current flow direction in the pixel circuit at this time, that is, flowing from the data signal writing transistor M3 to the source of the driving transistor DTFT to the threshold compensation transistor, and all the way to the gate of the driving transistor DTFT.

Figure 5D:
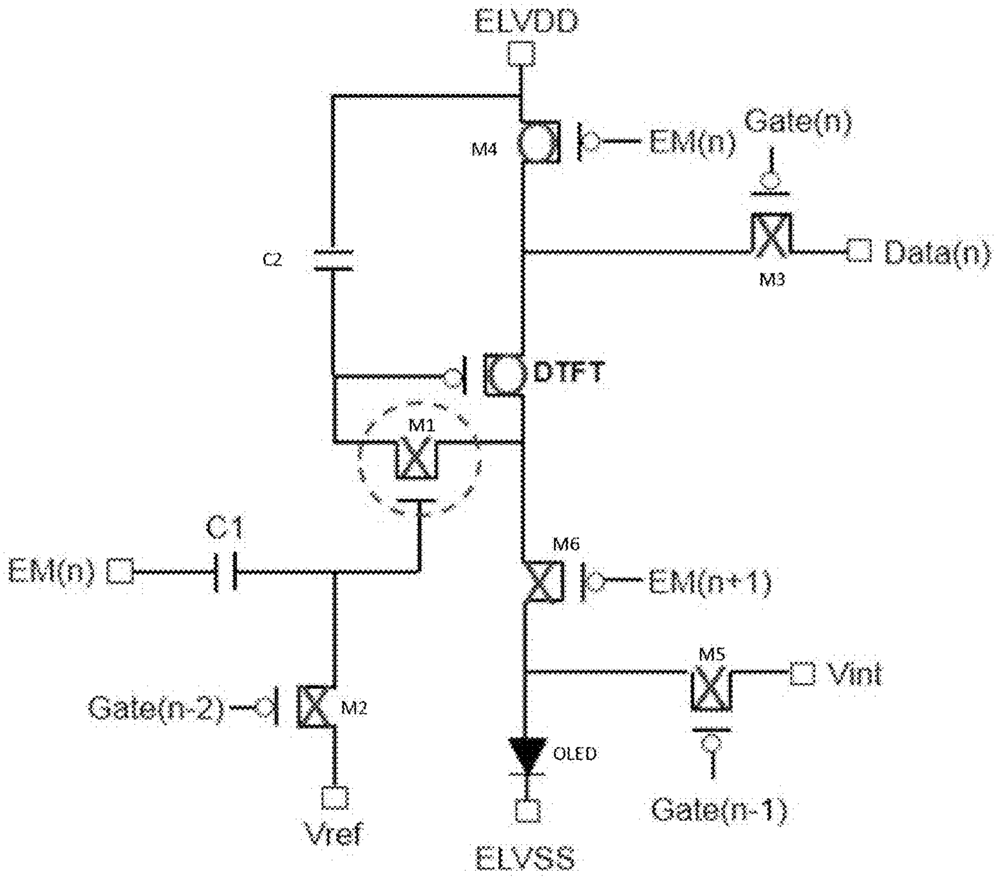

In the pre-light-emitting phase T4, the first light-emitting control signal of the first light-emitting control signal terminal EM(n) is hopped from the second level to the first level, so that the data signal writing transistor M4 is turned on, and the first power voltage of the first power voltage terminal ELVDD is transmitted to the source of the driving transistor DTFT. Moreover, since EM(n) changes from high to low, the level of the first node N1 is coupled back to Vref from Vref+(VGH−VGL). The voltage of the gate of the driving transistor DTFT is maintained at Vdata+Vth due to the presence of the second capacitor C2. In the pre-light-emitting phase T4, the conduction states of respective transistors are as shown in FIG. 5*d*.

Figure 5E:
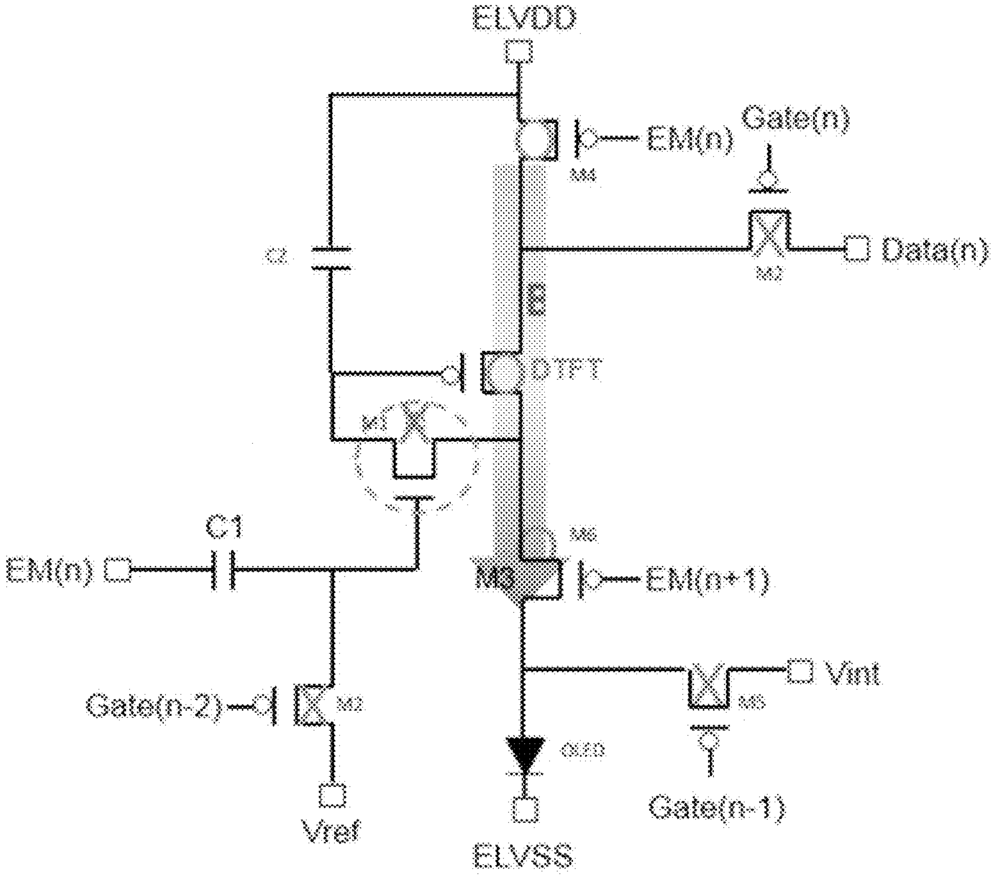

In the light-emitting phase T5, the second light-emitting control signal of the second light-emitting control signal terminal EM(n+1) becomes the first level, the light-emitting control transistor M6 is turned on, and the first power voltage of the first power voltage terminal ELVDD flows into the OLED via the driving current generated by the data writing transistor M4, the driving transistor DTFT, and the light-emitting control transistor M6, to drive the OLED to emit light. In the light-emitting phase T5, the conduction states of respective transistors are as shown in FIG. 5*e*. FIG. 5*e* also illustrates a current flow direction in the drive circuit at this time, that is, flowing from the first power voltage writing transistor M4 to the drive transistor DTFT to the light-emitting control transistor M6, and all the way to the light-emitting device OLED.

The driving current $I_{OLED}$ satisfies the following saturation current equation:

$$I_{OLED} = K(Vgs - Vth)^2 = K(Vdata + Vth - ELVDD - Vth)^2 = K(Vdata - ELVDD)^2 \text{ where } K = 0.5\ \mu_n \text{ Cox } \frac{W}{L},\ \mu_n$$

is the channel mobility of the driving transistor, Cox is the channel capacitance per unit area of the driving transistor, W and L are the channel width and channel length of the driving transistor, respectively, and Vgs is the gate-source voltage of the driving transistor (the difference between the gate voltage and the source voltage of the driving transistor).

As can be seen from the above equation, the current flowing through the OLED is independent of the threshold voltage of the driving transistor DTFT. Thus it can be seen, the method for driving the pixel circuit according to the embodiments of the present disclosure preferably achieves compensation of the threshold voltage of the driving transistor DTFT.

For example, for the operation time sequence of respective signals as shown in FIG. 4, the reference signal writing control signal of the reference signal writing control terminal Gate(n−2), the reset control signal of the reset control terminal Gate (n−1), and the data writing control signal of the data writing control terminal Gate(n) may be set to be successively delayed for a period of time. For example, outputs of front and rear stage shift registers in the pixel circuit may be used as the above three control signals, respectively. For example, the first light-emitting control signal of the first light-emitting control signal terminal EM(n) and the second light-emitting control signal of the second light-emitting control signal terminal EM(n+1) may also be set to be delayed from each other for a period of time. The operation time sequence of the respective signals shown in FIG. 4 is merely exemplary, and is not limited by the present disclosure.

Figure 6:
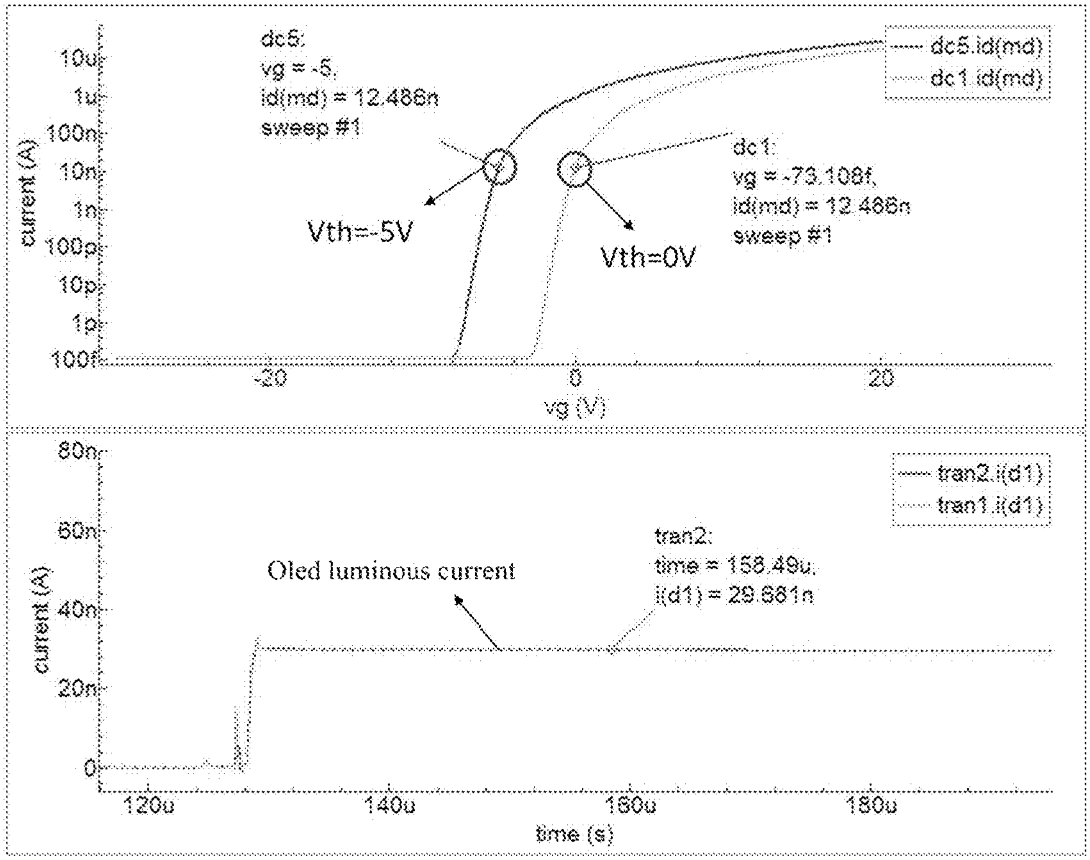
FIG. 6 is a graph illustrating a relationship between a current flowing through a threshold compensation transistor M1 of the pixel circuit shown in FIG. 2 and a gate-source voltage difference Vg of M1 simulated when different threshold voltages are set to the threshold compensation transistor M1, and a schematic graph of the current flowing through the OLED.

FIG. 6 is a graph illustrating a relationship between a current flowing through a threshold compensation transistor M1 of the pixel circuit shown in FIG. 2 and a gate-source voltage difference Vg of M1 simulated when different threshold voltages are set to the threshold compensation transistor M1, and a schematic graph of the current flowing through the OLED during this time.

As described above, the threshold voltage of the threshold compensation transistor M1 will shift when the pixel circuit has been operated for a period of time. In the embodiments of the present disclosure, the oxide N-type transistor is used as the threshold compensation transistor whose threshold voltage may shift in a negative direction. Thus, for example, simulation software such as SmartSpice may be used to set different threshold voltages for the threshold compensation transistor M1 in the pixel circuit shown in FIG. 2, to obtain a simulation schematic diagram of a current flowing through the threshold compensation transistor M1 under the different threshold voltages. The upper graph of FIG. 6 is a graph illustrating a relationship between the current flowing through the threshold compensation transistor M1 and its gate-source voltage difference simulated when the different voltage differences are set to the threshold compensation transistor M1. As shown in the upper diagram of FIG. 6, for example, the threshold voltage of the threshold compensation transistor M1 is set to 0 V (before shifting) and −5 V (after shifting), respectively, thus obtaining two corresponding current curves. The lower graph of FIG. 6 is a schematic graph of the current flowing through the OLED during this time. As can be seen from the lower graph of FIG. 6, curves of the current flowing through the OLED may be nearly coincident under the different threshold voltage settings described above. This further illustrates that the pixel circuit according to the embodiments of the present disclosure may well achieve compensation for the threshold voltage of the driving transistor, to overcome the defect that luminous brightness of light-emitting devices of respective pixel circuits are inconsistent with each other. Moreover, it can be seen from the upper graph of FIG. 6 that the current of the oxide transistor at the off state is relatively small and quite flat. Therefore, when an oxide transistor is used as the threshold compensation transistor, it can be ensured that, after the compensation of data voltage writing and the threshold voltage of the driving transistor are completed, the compensated state after the written of Data resources may be stably maintained.

Embodiments of the present disclosure further provides a display panel comprising the pixel circuit provided by any of the embodiments of the present disclosure.

Embodiments of the present disclosure further provides a display apparatus comprising the display panel provided above by the present disclosure. For example, the display apparatus may comprise any product or component having a display function such as a mobile phone, a tablet computer, a television, a display, a notebook computer, a digital photo frame, a navigator, and the like.

Although the present disclosure has been described in detail above with general description and specific implementations, it should be obvious to those skilled in the art that some modifications or improvements may be made to the present disclosure based on the embodiments of the present disclosure. Therefore, such modifications or improvements made without departing from the spirit of the present disclosure fall within the scope of the present disclosure.

What is claimed is:

1. A pixel circuit, comprising: a data signal writing module; a driving module; a threshold compensation transistor; a first power voltage writing module; a reference signal writing module; and a light-emitting module, wherein the driving module comprises a driving transistor, wherein:

the first power voltage writing module is connected to a first light-emitting control signal terminal, a first power voltage terminal, a source of the driving transistor and a gate of the driving transistor, and the first power voltage writing module is configured to write a first power voltage signal of the first power voltage terminal to the source of the driving transistor under control of a first light-emitting control signal of the first light-emitting control signal terminal;

the data signal writing module is connected to a writing control terminal, a data signal terminal and the source of the driving transistor, and the data signal writing module is configured to transmit a data signal of the data signal terminal to the source of the driving transistor under control of a writing control signal of the writing control terminal;

the threshold compensation transistor has a gate connected to a first node, a source connected to the gate of the driving transistor and a drain connected to a drain of the driving transistor, and the threshold compensation transistor is configured to perform voltage compensation to the gate of the driving transistor in case that the first node is at an valid level;

the reference signal writing module is connected to a reference control terminal, a reference signal terminal, the first light-emitting control signal terminal and the first node, and the reference signal writing module is configured to control potential of the first node according to a reference control signal of the reference control terminal and the first light-emitting control signal of the first light-emitting control signal terminal; and the light-emitting module has a first terminal connected to the drain of the driving transistor and a second terminal connected to a second power voltage terminal.

2. The pixel circuit of claim 1, wherein the threshold compensation transistor is an oxide transistor.

3. The pixel circuit of claim 1, wherein the pixel circuit further comprises:

a reset module connected to a reset control terminal, a reset potential terminal and the first terminal of the light-emitting module and configured to reset the first terminal of the light-emitting module and the gate of the driving transistor under control of a reset control signal of the reset control terminal.

4. The pixel circuit of claim 3, wherein the reset module comprises: a reset transistor having a gate connected to the reset control terminal, a source connected to the first terminal of the light-emitting module, and a drain connected to the reset potential terminal.

5. The pixel circuit according to claim 4, wherein a second power voltage of the second power voltage terminal is lower than a reset potential of the reset potential terminal.

6. The pixel circuit of claim 1, wherein the pixel circuit further comprises:

a light-emitting control module connected to a second light-emitting control signal terminal, the drain of the drive transistor and the first terminal of the light-emitting module, and configured to drive the light-emitting module to emit light under control of a second light-emitting control signal of the second light-emitting control signal terminal.

7. The pixel circuit of claim 6, wherein the light-emitting control module comprises:

a light-emitting control transistor having a gate connected to the second light-emitting control signal terminal, a source connected to the drain of the driving transistor, and a drain connected to the first terminal of the light-emitting module.

8. The pixel circuit of claim 1, wherein the reference signal writing module comprises:

a reference signal writing transistor having a gate connected to the reference control terminal, a source connected to the first node, and a drain connected to the reference signal terminal; and a first capacitor connected between the first light-emitting control signal terminal and the first node.

9. The pixel circuit of claim 1, wherein the data signal writing module comprises:

a data writing transistor having a gate connected to a data writing control terminal, a source connected to the data signal terminal, and a drain connected to the source of the drive transistor.

10. The pixel circuit of claim 1, wherein the first power voltage writing module comprises:

a first power voltage writing transistor having a gate connected to the first light-emitting control signal terminal, a source connected to the first power voltage terminal, and a drain connected to the source of the driving transistor.

11. The pixel circuit of claim 1, wherein the driving module further comprises:

a second capacitor connected between the first power voltage terminal and the gate of the driving transistor.

12. The pixel circuit of claim 1, wherein the light-emitting module comprises:

an organic light-emitting diode (OLED), an anode of the OLED serving as the first terminal of the light-emitting module, and a cathode of the OLED serving as the second terminal of the light-emitting module.

13. A display panel comprising the pixel circuit of claim 1.

14. A method for driving the pixel circuit of claim 1, comprising:

in a data writing and threshold compensation phase, writing the data signal of the data signal terminal to the source of the driving transistor, the writing control signal of the writing control terminal being at a first level, and the reference control signal of the reference control terminal being hopped from the first level to a second level, level of the first light-emitting control signal being hopped from the first level to the second level, level of the first node being raised, and potential of the gate of the driving transistor being compensated under control of the first node; and in a light-emitting phase, directing a driving current of the driving transistor to the light-emitting module to drive the light-emitting module to emit light, wherein the second light-emitting control signal of the second light-emitting control signal terminal is at the first level.

15. The method of claim 14, wherein: the pixel circuit further comprises:

a reference signal writing module connected to the reference control terminal, the reference signal terminal, the first light-emitting control signal terminal, and the first node; and the method further comprises: a first initialization phase and a second initialization phase, in the first initialization phase, in which the reference control signal of the reference control terminal is at a first level, transmitting the reference signal of the reference signal terminal to the first node; and in the second initialization phase, transitioning the reference control signal of the reference control terminal from the first level to the second level, transitioning the level of the first light-emitting control signal from the first level to the second level, and raising the level of the first node.

16. The method of claim 15, wherein the reference signal of the reference signal terminal is adjusted based on an offset of a threshold voltage of the threshold compensation transistor after the pixel circuit has operated for a preset time.

17. The method of claim 14, wherein: the pixel circuit further comprises:

a reset module connected to the reset control terminal, the reset potential terminal, and the first terminal of the light-emitting module; and the method further comprises: a second initialization phase, in the second initialization phase, in which the reset control signal of the reset control terminal is at the first level, applying the reset potential of the reset potential terminal to the first terminal of the light-emitting module and the gate of the driving transistor.

18. The method of claim 14, wherein: the pixel circuit further comprises:

a light-emitting control module connected to the second light-emitting control signal terminal, the drain of the driving transistor, and the first terminal of the light-emitting module; and after the data writing and threshold compensation phase and before the light-emitting phase, the method further comprises:

a pre-light-emitting phase, in the pre-light-emitting phase, in which the first light-emitting control signal of the first light-emitting control signal terminal is at a first level, transmitting a first power voltage of the first power voltage terminal to the source of the driving transistor.

19. The method of claim 14, wherein gate potential of the drive transistor is compensated as a sum of potential of the data signal and threshold potential of the drive transistor in the data writing and threshold compensation phase.

* * * * *